310-369 SR
XR 2,870,521 79
SEARCH ROOM

METHOD OF ADJUSTING THE RESONANT FREQUENCY
OF A VIBRATING SYSTEM
Filed Feb. 24, 1955

INVENTOR.
NORMAN RUDNICK
BY
Cyrus D. Samuelson
ATTORNEY

2870521
OR IN 29/25.35

2,870,521

METHOD OF ADJUSTING THE RESONANT FREQUENCY OF A VIBRATING SYSTEM

Norman Rudnick, New Brunswick, N. J., assignor to Gulton Industries, Inc., Metuchen, N. J., a corporation of New Jersey Application February 24, 1955, Serial No. 490,229
3 Claims. (Cl. 29—25.35)

Figures 1, 2, 3, 4, 5, 6, 7, 8, 9:
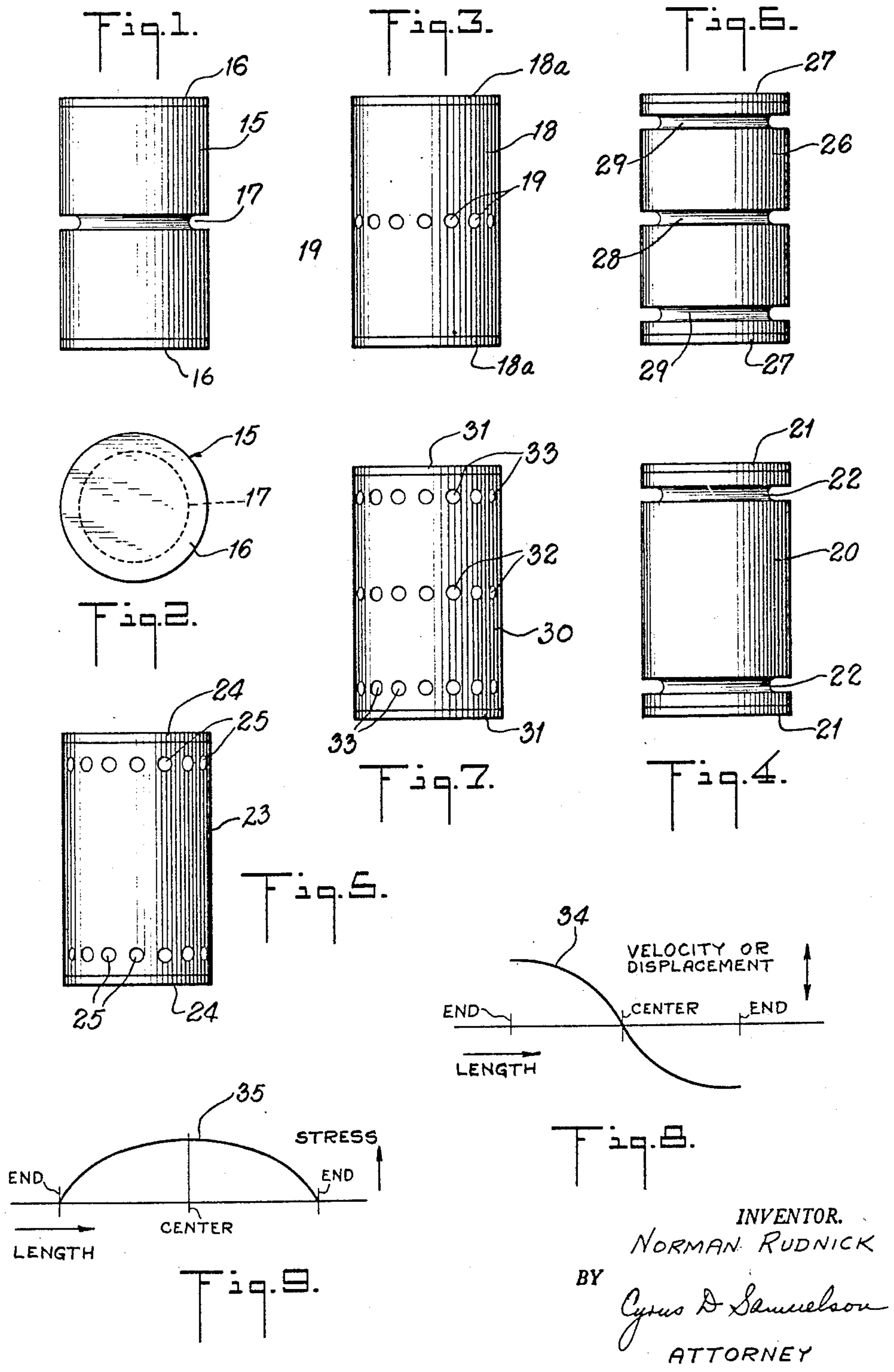

My invention relates to methods of adjusting the resonant frequency of vibrating systems and in particular to adjusting the resonant frequencies of electromechanical systems without changing the system dimensions.

Due to the inherent variations which are encountered in the manufacture and production of piezoelectric ceramics, it is not feasible to produce these elements to a specified exact resonant frequency. It is feasible, however, to produce these elements to a resonant frequency within certain reasonable limits of resonant frequency. Where close accurate resonant frequencies are required, it is the practice to produce the piezoelectric ceramic so that it is resonant at a frequency lower than the desired frequency, measure the resonant frequency and then grind off one end of the finished element. This is done because the resonant frequency is raised as the length of the piezoelectric ceramic is lessened. This method removes at least one of the electrodes and in order to deposit a new electrode on the surface it is necessary to heat the material. The heating depolarizes the ceramic and repolarization is required. This repolarization introduces an additional variable and possible variation in the piezoelectric properties so that the relationship between dimension and resonant frequency may be somewhat different from the relationship arrived at for the original piece. This method only permits one to raise the resonant frequency by reducing the dimensions and does not permit one to lower the resonant frequency of a particular piezoelectric ceramic piece.

It is, accordingly, a principal object of my invention to provide a method of raising and lowering the resonant frequency of a piezoelectric ceramic without altering the major dimensions.

It is a further object of my invention to provide a method of raising and lowering the resonant frequency of piezoelectric ceramics without disturbing the electrodes or the existing condition of polarization of the piezoelectric ceramic piece.

Other objects and advantages of my invention will be apparent during the course of the following description.

In the accompanying drawings, forming a part of this application, and in which like numerals are employed to designate like parts throughout the same, Figure 1 is an elevation of a transducer produced in accordance with my invention wherein there is a groove at a nodal surface, Figure 2 is a plan view of the transducer of Figure 1, Figure 3 is an elevation of a transducer produced in accordance with my invention wherein there are discrete indentations at a nodal surface, Figure 4 is an elevation of a transducer produced in accordance with my invention wherein there are grooves at or near surfaces of velocity loops, Figure 5 is an elevation of a transducer produced in accordance with my invention wherein there are discrete indentations at or near surfaces of velocity loops, Figure 6 is an elevation of a transducer produced in accordance with my invention wherein there are grooves at nodal surfaces and at or near velocity loop surfaces, Figure 7 is an elevation of a transducer produced in accordance with my invention wherein there are discrete indentations at nodal surfaces and at or near velocity loop surfaces, Figure 8 is a plot of velocity or displacement against length, and Figure 9 is a plot of stress against length.

In the drawings, wherein for the purpose of illustration, are shown preferred embodiments of my invention, the numeral 15 designates a transducer, the numeral 16 designates the electrodes of transducer 15 and the numeral 17 designates a groove cut in transducer 15 at it nodal plane. The numeral 18 designates a transducer, the numeral **18*a* designates the electrodes of transducer 18 and the numeral 19 designates holes cut in transducer 18 at its nodal plane. The numeral 20 designates a transducer, the numeral 21 designates the electrodes of transducer 20 and the numeral 22 designates grooves cut in transducer 20** at planes at, or near, the planes of velocity loops.

The numeral 23 designates a transducer, the numeral 24 designates the electrodes of transducer 23 and the numeral 25 designates holes cut in transducer 23 at planes at, or near, planes of velocity loops. The numeral 26 designates a transducer, the numeral 27 designates the electrodes of transducer 26, the numeral 28 designates a groove cut in transducer 26 at its nodal plane and the numeral 29 designates grooves cut in transducer 26 at planes at, or near, planes of velocity loops. The numeral 30 designates a transducer, the numeral 31 designates the electrodes of transducer 30, the numeral 32 designates holes cut in transducer 30 at its nodal plane, and the numeral 33 designates holes cut in transducer 30 at planes at, or near, planes of velocity loops. The numeral 34 designates the curve which is a plot of velocity or displacement against length and the numeral 35 designates the curve which is a plot of stress against length.

I have chosen to illustrate my invention by means of solid right circular cylinders which have their electrodes bonded on the bases of the cylinder and have been polarized parallel to the long axis but the same technique may be employed for other shapes. The transducer 15 illustrated in Figures 1 and 2 has groove 17 cut into it at the nodal plane of the fundamental resonant frequency of 15. Groove 17 is not cut too deeply into transducer 15 since it is not desirable to reduce the mass of 15 by any appreciable amount. The groove 17 at, or near, the plane of a velocity node or stress loop increases the compliance of the system, with very small change in mass, thereby decreasing the resonant frequency of the system. The removal of material of the transducer at the nodal plane may be accomplished by a groove such as groove 17 of Figure 1 or by holes 19 such as are illustrated in Figure 3. In the cases illustrated in Figures 1 and 3, the resonant frequency of transducers 15 and 18 are measured and if the frequency is found to be too high either a groove such as groove 17 or shallow holes such as 19 are cut in transducers 15 and 18 respectively until the frequency is found to be correct for the particular application of the respective transducers. Any other shape of penetration into the transducer may be employed with equally good effect so long as the compliance is increased without any appreciable decrease in the mass of the transducer. These adjustments in the resonant frequency of the transducers 15 and 18 may be made without disturbing the electrodes 16 or **18*a*, or heating the transducers 15 and 18 or affecting the condition of polarization of the transducers 15 or 18**.

When it is desirable to lower a resonant frequency other than the fundamental frequency of a transducer, the material is removed at the nodal planes for the particular harmonic frequency for which the adjustment is being made.

Figures 4 and 5 illustrate the groove and hole method for raising the resonant frequency of transducers 20 and 23 respectively. In these two illustrations, material is removed by grooves 22 or holes 25 at, or near, the planes of velocity loops. These adjustments in the resonant frequencies of transducers 20 and 23 are accomplished without disturbing the electrodes 21 or 24 or affecting the condition of polarization of the transducers. Any other shape of penetration in the material of the transducers may be employed as long as the mass-compliance product is decreased, with little change in compliance.

In Figure 6, the resonant frequency of the transducer 26 has been reduced by the cutting of groove 28 in transducer 26 at the nodal plane. Upon measurement, it has been found that the frequency had been reduced too much so that it was then necessary to cut grooves 29 at, or near, the planes of velocity loops in order to raise the resonant frequency of transducer 26. These adjustments were made without disturbing the electrodes 27 or the condition of polarization of transducer 26. The figure serves equally well to illustrate the final condition of transducer 26 wherein the resonant frequency of 26 was first raised by cutting grooves 29 and was then lowered by cutting groove 28.

Figure 7 illustrates the condition of Figure 6 except that holes 32 and 33 are cut into transducer 30 at the nodal plane and at, or near, the planes of velocity loops respectively. Electrodes 31 were not disturbed in this process and the condition of polarization of transducer 30 was left unaffected. Any other type of penetration into the transducer may be employed with equal effect as long as the mass of the transducer is not materially affected.

Grooves 22 and 29 and holes 25 and 33 are shown close to the ends of their respective transducers. The actual planes of velocity loops are at the electrodes 24 and 27 but it is not desirable to remove the electrodes and since the velocity loops are broad as shown in Figure 8, the moving of these penetrations into the respective transducers by a small distance does not materially alter the effect of these cuts or penetrations. On the other hand, a change in the position of grooves 17 and 28 and holes 19 and 32 will materially alter the effect of these cuts or penetrations because of the sharp node as shown in Figure 8 and illustrated by the slope of curve 34 as it crosses the horizontal axis. The nodal plane also locates the position of greatest stress of the vibrating system as shown by curve 35 in Figure 9.

The location of the planes of velocity nodes and loops depends on the particular resonant frequency chosen, the number of such planes increasing as the number of the harmonic is increased.

I have illustrated my invention by means of ceramic piezoelectric transducers which are right circular cylinders vibrating in the length modes. The invention is equally applicable to vibrating systems which are excited in other modes and of other shapes; in many of which cases the nodal surfaces and the surfaces of velocity loops are not planes.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described herein.

Having thus described my invention, I claim:

1. The method of lowering the resonant frequency of a piezoelectric ceramic electromechanical transducer which comprises removing small masses from said transducer at at least one of the nodal surfaces of said transducer.

2. The method of raising the resonant frequency of a piezoelectric ceramic electromechanical transducer which comprises removing small masses from said transducer at at least one of the surfaces of velocity loops of said transducer.

3. The method of adjusting the resonant frequency of a piezoelectric ceramic electromechanical transducer which comprises removing small masses from said transducer at at least one of the nodal surfaces of said transducer to lower the resonant frequency and removing small masses from said transducer at at least one of the surfaces of velocity loops of said transducer to raise the resonant frequency.

References Cited in the file of this patent

UNITED STATES PATENTS 2,018,246 Beard ---------------- Oct. 22, 1935